Patented Oct. 21, 1941

2,259,734

UNITED STATES PATENT OFFICE 2,259,734

METALLIZED ACID POLYAZO DYES

Moses L. Crossley, Plainfield, and Lincoln M. Shafer, Upper Montclair, N. J., assignors to American Cyanamid Company, New York, N. Y., a corporation of Maine No Drawing. Application October 31, 1939, Serial No. 302,132

12 Claims. (Cl. 260—145)

This invention relates to metallized polyazo dyes which show excellent fastness to light and more particularly, polyazo dyes metallized with the metals of the 7th and 8th groups of the periodic table of elements especially manganese, iron, cobalt and nickel.

This application is in part a continuation of our co-pending application, Serial No. 150,540, filed June 26, 1937, which matured into U. S. Patent No. 2,213,647 on September 3, 1940.

The metallized dyes of the present invention are obtained by metallizing a polyazo dye having a middle component which is a dihydroxy aryl compound capable of combining with two molecules of diazo compounds in positions ortho to the hydroxy groups, at least one of the diazo compounds having a metallizable group such as a hydroxyl or carboxyl group ortho to the azo group and at least one end component containing a solubilizing group. The dyes may be represented by the following general structural formula:

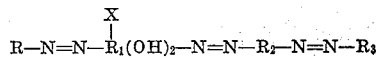

in which R, $R_1$, $R_2$ and $R_3$ are aryl radicals, the hydroxyl groups on $R_1$ are ortho to the azo groups, X represents groups such as halogen, alkyl, alkoxy, nitro, carboxyl, sulfonic, hydroxyl and hydrogen. At least one of the radicals R and $R_2$ has a metallizable group ortho to the azo group connecting the radical to $R_1$ and at least one of the radicals R and $R_3$ has a solubilizing group.

In carrying out the present invention, the polyazo dyes are metallized with one or more metals of the 7th and 8th groups of the periodic table of elements such as manganese, iron, cobalt and nickel or combinations with other metals such as manganese-chromium, cobalt-chromium, nickel-chromium iron-chromium, iron-copper, etc. These combinations of metals react with the dye to produce a product which is not identical with the mixture of the products obtained by treating portions of the dye with separate metals. The metallic combination or complex enters into the dye molecule in some manner which is different from the reaction of a single metal. The precise form of chemical combination has not yet been determined.

The ratio of the metal or metal complex to the dye may vary within wide limits and may depend on the nature of the metal and the number and nature of the metallizable groups in the dye molecule. Where more than one metal is to enter the molecule of the dye, it is, of course, necessary that there be a plurality of pairs of metallizable groups. Such cases correspond to a species under the general formula in which both R and $R_2$ contain hydroxyl or carboxyl groups ortho to the azo groups.

The present invention is not limited to a particular process of producing the dyes. Normally they will be prepared by coupling the dihydroxy compound with a diazo compound and a diazo azo compound. Of course, the polyazo dyes may be produced by successive couplings of diazo amino compounds which are then rediazotized and further coupled. The end components may be the same or different.

Metallization is effected in the normal manner, for example, by refluxing an aqueous solution of the dye with salts or other suitable compounds of the metals or mixed metals.

In general, the new dyes are dark colored powders which are quite soluble in water and are capable of producing valuable colors of varied tones when dyed from an acid bath on wool, silk, leather and furs. The dyes show good to excellent fastness to light, washing, fulling, acid, alkalies, and sea water. The degree of fastness will vary with the particular dyes and with the metals used. The dyes of the class here described, when metallized with manganese, cobalt, nickel, or iron, exhibit extraordinary fastness to light. Combinations of two or more of these metals also give excellent results and combinations may be made of one or more metals belonging to other groups of the periodic system.

The invention will be described in detail in the following examples but it should be understood that the invention is not limited to the details set forth therein.

Example 1

11.05 parts of picramate of soda are suspended in 50 parts of water and diazotized with 6.4 parts hydrochloric acid (real) and 3.66 parts of sodium nitrite keeping the temperature between 25° and 30° C. The excess of acidity is neutralized with a saturated solution of bicarbonate of soda. This diazo solution is then added to a solution containing 5.88 parts of resorcinol in 200 parts of water and 8.5 parts of bicarbonate of soda. The mixture is stirred until coupling is complete and 14.5 parts of soda ash added. Then a diazo solution obtained by treating 14.7 parts of amino azo benzene sulfonic acid in 170 parts of water with 3.66 parts of nitrite and 5.6 parts of acid at 60°–63° C. is added and the mixture stirred until coupling is complete. The dye is salted out with sodium chloride after the solution is made slightly acid to Congo. The resulting dye paste is dissolved in 800 parts of hot water and 12 parts of sodium acetate added. The solution is heated to 60° C. and a solution containing 12 parts of manganese chloride added. The entire mixture is then boiled for two hours and salted out with sodium chloride, filtered and dried at 65°–70° C. The product is a dark brown powder, soluble in water, producing a brownish red color. It dyes animal fibers reddish tones of brown of excellent fastness.

The formula for the dye prior to metallization is as follows:

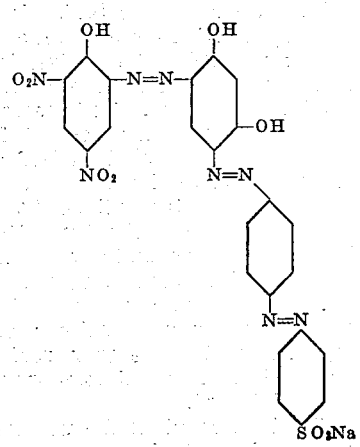

*Example 2*

160 parts of 1,5-dihydroxy naphthalene is suspended in 2500 parts of water and 400 parts of soda ash are added. The solution is cooled with ice to 5°–10° C. and then mixed with the diazo product obtained from 189 parts of 2-aminophenol-4-sulfonic acid. The mixture is stirred until coupling is complete. Then the diazo compound obtained from 307 parts of the dye produced by coupling para-aminosalicylic acid with alpha naphthylamine in acid solution is added. Sufficient sodium carbonate to have the reaction alkaline throughout the coupling is added. Then the mixture is stirred until the second coupling is complete. The reaction must be alkaline throughout the coupling. The mixture is then made acid to Congo and the dye salted out with sodium chloride. The dye is filtered and the paste suspended in 6000 parts of water and treated with 240 parts of cobalt chloride, then the mixture is boiled for several hours. The resulting dye is then salted out with sodium chloride. It is soluble in water and dyes animal fibers black. Other metals mentioned in the specification may be substituted for cobalt and similar metallized products obtained.

The formula for the dye prior to metallization is as follows:

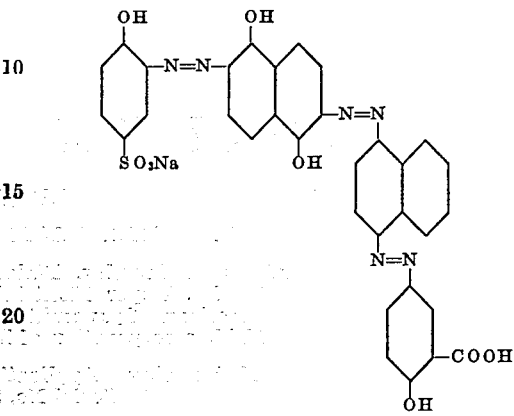

*Example 3*

Dissolve one molecular weight of the dye obtained by coupling tetrazotized dianisidine with two equivalents of the diazotized product obtained by coupling 4-chlor-2-amino-1-phenol-5-sulfonic acid onto 1,5-dihydroxy naphthalene in ten times its weight of water. Add two molecular equivalents of sodium acetate and two molecular equivalents of nickel sulfate. Adjust the pH to 4 and boil for 6 hours. Salt out the metallized dye with sodium chloride, filter, dry at about 70° C. The resulting product is a dark powder, soluble in water. It produces reddish tones of blue.

By substituting one molecular equivalent of copper sulfate or chromium sulfate for one molecular equivalent of the nickel sulfate the complex nickel-copper or nickel-chromium metallized dye is produced.

The formula for the dye prior to metallization is as follows:

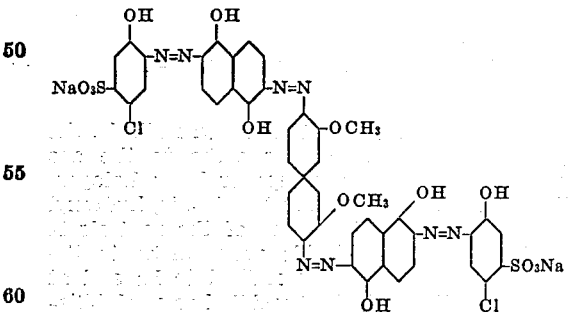

*Example 4*

Dissolve 1 molecular weight of the dye obtained by coupling resorcinol-4-nitro-diazo-o-phenol and then diazo-phenyl-azo-phenyl-methyl-pyrazolone sulfonic acid in ten times its weight of water. Add 1.2 molecular equivalents of sodium acetate and an equal molecular equivalent of iron sulfate. Adjust the acidity to a pH of 4, boil for 4 hours, salt out the metallized dye with sodium chloride. Filter and dry at 60°–70° C. The product is a dark powder, soluble in water and dyeing animal fibers yellowish tones of brown.

The formula for the dye prior to metallization is as follows:

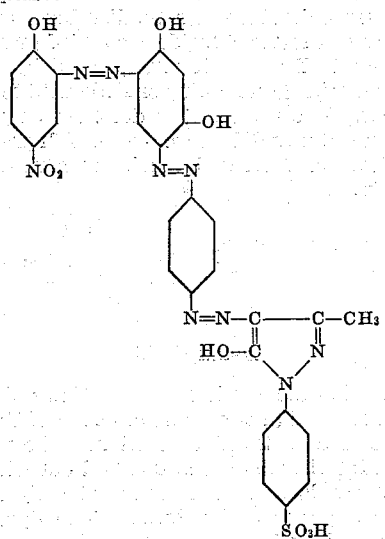

*Example 5*

Dissolve in water one molecular equivalent of the dye obtained by coupling to one mole of resorcinol first one mole of amino azo benzene para sulfonic acid and then one mole of picramic acid. Add two molecular equivalents of sodium acetate and 270 parts of ferric chloride. Adjust the pH to approx. 4 and boil for three hours. Precipitate the dye with 20% sodium chloride and by making slightly acid to Congo red paper, filter and dry. The product is a brown powder and dyes animal fibers a yellowish-brown tone.

The formula for the dye prior to metallization is as follows:

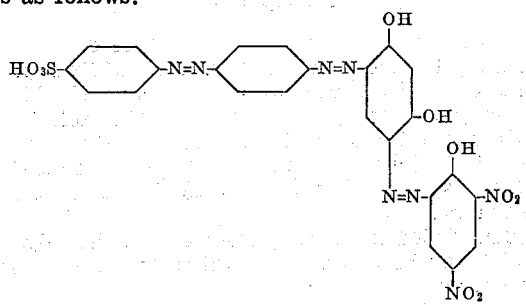

*Example 6*

By substituting 292 parts of nickel nitrate for the ferric chloride of Example 5 a brown powder is produced which dyes animal fibers reddish brown.

*Example 7*

By substituting 240 parts of cobalt chloride for the ferric chloride of Example 5 a brown powder is produced which dyes animal fibers yellowish brown.

*Example 8*

By substituting 290 parts of manganese nitrate for the ferric chloride of Example 5 a brown powder is produced which dyes animal fibers reddish brown.

*Example 9*

154 parts of para nitro ortho amino phenol are dissolved in 200 parts of water and diazotized with the addition of 30 parts of 36% hydrochloric acid and 69 parts of sodium nitrite at 10° C. and cooled to 5°–0° C.

160 parts of soda ash are added to the dye produced by coupling 277 parts of amino azo benzene para sulfonic acid to 194 parts of hexyl resorcinol. The nitro amino phenol diazo is added to this dye and coupling allowed to stir overnight. The dye is precipitated by addition of 15 parts of sodium chloride per 100 parts of volume and the dye is filtered.

The dye is metallized by adding 270 parts per mole of ferric chloride to the dye solution and boiling for three hours. The dye is precipitated with 20% sodium chloride, made slightly acid to Congo red paper, filtered and dried. The product is a brown powder, soluble in water and dyes animal fibers an olive brown tone.

The formula for the dye prior to metallization is as follows:

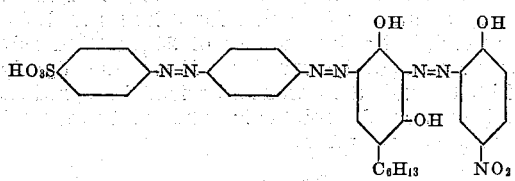

*Example 10*

By substituting 292 parts of nickel nitrate crystals for the ferric chloride of Example 9 a brown powder is produced which dyes animal fibers brown.

*Example 11*

By substituting 240 parts of cobalt chloride for the ferric chloride of Example 9 a brown powder is produced which dyes animal fibers brown.

*Example 12*

By substituting 290 parts of manganese nitrate for the ferric chloride of Example 9 a brown powder is produced which dyes animal fibers reddish brown.

*Example 13*

The diazo equivalent to 27.7 parts real amino azo benzene para sulfonic acid, dissolved in 500 cc. of solution is coupled to 19.4 parts of hexyl resorcinol at 0°–5° C. in the presence of 20% sodium acetate solution. 22.1 parts of sodium picramate are dissolved in 400 cc. of hot water and 30 parts of 36% hydrochloric acid are added and the slurry is cooled to 25° C. At 25°–30° C. it is diazotized with 6.9 parts of sodium nitrate dissolved in water. After 45 minutes the diazotization is complete and the slurry is cooled to 5°–0° C.

16 parts of soda ash are added to the dye and the diazo picramic acid added and the coupling allowed to stir over night. The next morning the pH is adjusted to 6. A very faint trace of red shows on methyl red yellow and it is negative to brilliant yellow paper. The dye produced is filtered without the addition of salt and when dry it is a brown color which dyes wool a brown tone.

270 parts of ferric chloride dissolved in water are added and boiled for 3 hours. The dye is precipitated with 20% salt and by making slightly acid to Congo red paper. The product is a brown powder soluble in water and dyes wool a brown shade.

The dye prior to metallization has the following formula:

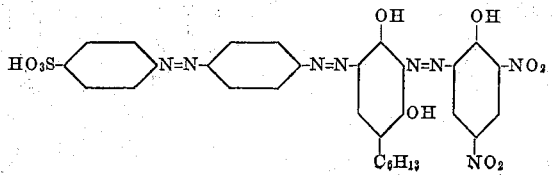

Example 14

292 parts of nickel nitrate crystals instead of ferric chloride, are dissolved in water and added to the dye solution of Example 13. The mixture is boiled for 3 hours and salted out with 20 parts of sodium chloride per 100 parts of the dye solution. It is made slightly acid to Congo red paper and filtered. The dye, when dried, is a brown powder, soluble in water and dyes wool a reddish brown tone.

Example 15

240 parts of cobalt chloride instead of the ferric chloride, are dissolved in water and added to the dye solution of Example 13 with the pH adjusted to approximately 4; boiled for 3 hours and the dye precipitated by the use of 20 parts of salt per 100 parts of dye solution. It is made slightly acid to Congo red, filtered and dried. The product is a brown powder soluble in water and dyes wool a yellowish brown tone.

Example 16

290 parts of manganese nitrate instead of the ferric chloride, are dissolved in water and added to the dye solution of Example 13 with the pH adjusted to approximately 4. The solution is boiled for 3 hours. After salting out and drying a brown powder is produced. This is soluble in water and dyes wool a red-brown tone.

Example 17

22.1 parts of sodium picramate are dissolved in 400 parts of water and stirred to complete solution, then 12.6 parts of hydrochloric acid, 100% are added. The mixture is cooled to 30° C. and diazotized with the addition of 6.9 parts of sodium nitrite dissolved in water. 34.2 parts of chromotropic acid are dissolved in 400 parts of water with the addition of 9.4 parts of sodium bicarbonate. This solution is added to the picramic acid diazo and allowed to cool over night. The diazo from 27.7 parts of amino-azo benzene is added to this monazo dye. 8 parts of magnesium oxide are added and the coupling is stirred for 4 or 5 hours. 600 parts of salt are added and hydrochloric acid is added until there is a faint but permanent test on Congo red paper. The dye is filtered after it has been stirred for several hours to complete precipitation. The product when filtered and dried is a dark blue powder which dyes animal fibers a reddish blue tone.

270 parts of ferric chloride are added and boiled for 3 hours. The dye is precipitated by adding sodium chloride and making slightly acid to Congo red paper. The product is a dark brown powder, soluble in water and dyes wool a reddish gray tone.

The formula for the dye prior to metallization is as follows:

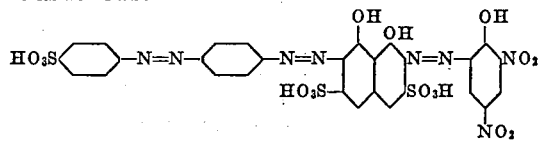

Example 18

292 parts of nickel nitrate crystals are dissolved in water instead of the ferric chloride of Example 17 and added to the dye solution. The mixture is boiled for three hours and salted out with 20% of sodium chloride. It is made slightly acid to Congo red paper and filtered. The dye, when dried, is a dark brown powder, soluble in water and dyes wool a violet gray tone.

Example 19

240 parts of cobalt chloride are dissolved in water instead of the ferric chloride of Example 17 and added to the dye solution with the pH adjusted to approximately 4; it is boiled for three hours and the dye precipitated by the use of 20 parts of salt per 100 parts of dye solution. It is made slightly acid to Congo red and filtered and dried. The product is a dark brown powder soluble in water and dyes wool a violet gray tone.

Example 20

290 parts of manganese nitrate were dissolved in water instead of the ferric chloride of Example 17 and added to the dye solution which had had its pH adjusted to approximately 4. The solution was boiled for three hours. After salting out and drying, a dark brown powder was produced. This was soluble in water and dyed wool a violet gray tone.

The following table illustrates further dyes which can be produced according to the present invention.

Table of types of dye

| First component | Middle component | Second component | Color produced by metallized product | | | |
|---|---|---|---|---|---|---|
| | | | Mn | Fe | Co | Ni |
| OH, NH₂, Cl (substituted phenol) | OH, OH (dihydroxybenzene) | H₂N-naphthalene | Bluish black | Brown | Bluish black | Bluish black |
| OH, O₂N, NH₂, NO₂ (substituted phenol) | OH, OH (dihydroxynaphthalene) | NH₂, SO₃H, N=N-naphthalene-SO₃H | Black | do | Black | Black |

*Table of types of dyes*—Continued

| First component | Middle component | Second component | Color produced by metallized product | | | |
|---|---|---|---|---|---|---|
| | | | Mn | Fe | Co | Ni |
| (structure) | (structure) | (structure) | Brown | Yellow brown | Brown | Brown |
| (structure) | (structure) | (structure) | Green | Brown | Green | Green |
| (structure) | (structure) | (structure) | Yellow brown | Olive brown | Yellow brown | Yellow brown |
| (structure) | (structure) | (structure) | Blue | Brown | Blue | Blue |
| (structure) | (structure) | (structure) | Brown | ...do... | Brown | Brown |
| (structure) | (structure) | (structure) | Blue | ...do... | Blue | Blue |
| (structure) | (structure) | (structure) | Brown | Dark brown | Blue red | Blue red |
| (structure) | (structure) | (structure) | Blue | Brown | Blue | Blue |

*Table of types of dyes*—Continued

| First component | Middle component | Second component | Color produced by metallized product ||||
|---|---|---|---|---|---|---|
| | | | Mn | Fe | Co | Ni |
| (structure: OH, NH₂, HO₃S, CH₃ substituted benzene) | (1,4-dihydroxynaphthalene) | (structure: naphthylamine sulfonic acid with N=N linkages to naphthol sulfonic acid and chlorophenol) | Red blue | Brown | Red blue | Red blue. |
| (2,4-dinitro aminophenol) | (dihydroxybenzene) | (aminobenzene-N=N-benzene sulfonic acid) | ...do... | ...do... | Brown | Brown. |
| (3-amino-4-hydroxy benzene sulfonic acid) | (1,4-dihydroxynaphthalene) | (aminobenzene-N=N-benzene-N=N-pyrazolone with phenyl sulfonic acid) | Green | Olive | Green | Green. |
| (1-amino-2-hydroxy-4-sulfo naphthalene) | (resorcinol) | (1-amino-naphthalene-N=N-naphthalene sulfonic acid) | Blue | Brown | Blue | Blue. |
| (bis-azo naphthylamine disulfonic acid) | (dihydroxybenzene) | (chloro-aminophenol) | Brown | Dark brown | Brown | Brown. |
| (1-amino-2-hydroxy-4-sulfo naphthalene) | (1,4-dihydroxynaphthalene) | (amino-dimethylbenzene-N=N-benzene sulfonic acid) | Red blue | ...do... | Red blue | Red blue. |

Table of types of dyes—Continued

| First component | Middle component | Second component | Color produced by metallized product ||||
|---|---|---|---|---|---|---|
| | | | Mn | Fe | Co | Ni |
| (structure) | (structure) | (structure) | Red blue. | Dark brown. | Brown. | Brown. |
| (structure) | (structure) | (structure) | Red. | Brown. | Red. | Red. |
| (structure) | (structure) | (structure) | Blue. | ...do..... | Blue. | Blue. |
| (structure) | (structure) | (structure) | Red. | ...do..... | Red. | Red. |
| (structure) | (structure) | (structure) | Blue. | Dark brown. | Blue. | Blue. |

The unmetallized dye compounds described in the present application wherein the middle component is hexylresorcinol are new chemical compounds and are not claimed as a part of the present invention which is limited to the complex metallized compound produced by metallizing the dye with metals of the seventh and eighth groups of the periodic table of the elements.

What we claim is:

1. Metallized azo dyes having the following formula:

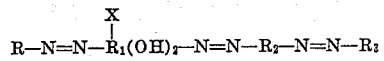

in which R, $R_1$, $R_2$ and $R_3$ are aryl radicals, the hydroxyl groups on $R_1$ are ortho to the azo groups and X represents a member of the group consisting of halogen, alkyl, alkoxy, nitro, carboxyl, sulfonic, hydroxyl and hydrogen, at least one of the radicals R and $R_2$ has a metallizable group ortho to the azo group connecting the radical to $R_1$ and at least one of the radicals R and $R_3$ has a solubilizing group, the dye being metallized with at least one of the metals included in the seventh and eighth groups of the periodic table of elements.

2. Metallized azo dyes, the azo dye component of which has the following formula:

in which $R_1$ is a radical of the benzene series having the hydroxyl groups ortho to the azo groups and R, $R_2$ and $R_3$ are aryl radicals, at least one of the radicals R and $R_2$ has a metallizable group ortho to the azo group connecting the radical with $R_1$ and at least one of the radicals R and $R_3$ has a solubilizing group, and the dye being metallized with at least one of the 3. Metallized azo dyes, the azo dye component of which has the following formula:

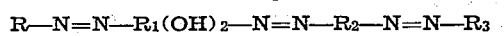
R—N=N—R₁(OH)₂—N=N—R₂—N=N—R₃ in which the radicals R, R₂ and R₃ are aryl radicals, R₁ is a radical of the naphthalene series having the hydroxyl groups ortho to the two azo groups, at least one of the radicals R and R₂ having a metallizable group ortho to the azo group connecting the radical R₁, and at least one of the radicals R and R₃ containing a solubilizing group, the dye being metallized with at least one of the metals included in the seventh and eighth groups of the periodic table of elements.

4. A metallized azo dye according to claim 1 in which both R and R₂ contain metallizable groups ortho to the azo groups connecting these radicals with R₁.

5. A metallized azo dye according to claim 1 in which R₃ is an aryl-azo-aryl radical.

6. A metallized azo dye according to claim 1 in which R₃ is an aryl radical free from azo groups except the one connecting to R₂.

7. A metallized azo dye according to claim 2 in which R is phenol with the hydroxyl group ortho to the azo group and R₂ is an azobenzene radical.

8. A metallized azo dye according to claim 2 in which R is

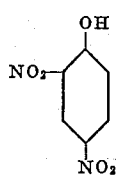

9. A metallized trisazo dye of the general formula:

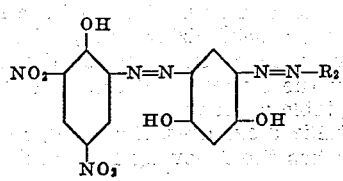

in which R₂ represents a radical of a 4'-sulfonic acid azobenzene, the dye being metallized with at least one metal included in the seventh and eighth groups of the periodic table of elements.

10. A complex iron compound of the trisazo dyestuff of the following formula:

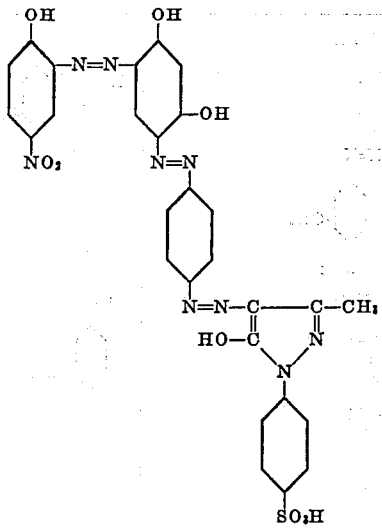

11. A complex nickel compound of the tetrakisazo dyestuff of the formula:

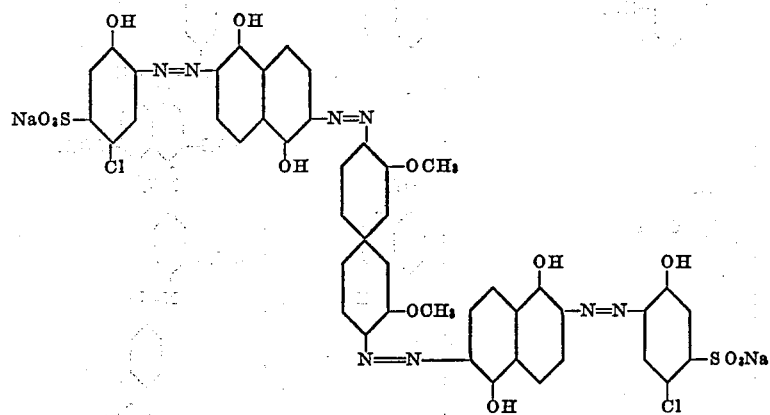

12. A metallized azo dye according to claim 1 in which both R and R₂ contain metallizable groups ortho to the azo groups connecting these radicals to R₁ and the dye metalized with a mixture of at least one of the metals included in the seventh and eighth groups of the periodic table of elements with at least one of the metals included in the group consisting of chromium and copper.

MOSES L. CROSSLEY.
LINCOLN M. SHAFER.